(12) United States Patent
Lu et al.

(10) Patent No.: US 11,361,590 B2
(45) Date of Patent: Jun. 14, 2022

(54) METHOD AND APPARATUS FOR MONITORING WORKING STATE

(71) Applicant: BEIHANG UNIVERSITY, Beijing (CN)

(72) Inventors: Feng Lu, Beijing (CN); Qinping Zhao, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 259 days.

(21) Appl. No.: 16/729,293

(22) Filed: Dec. 27, 2019

(65) Prior Publication Data

US 2021/0034845 A1 Feb. 4, 2021

(30) Foreign Application Priority Data

Jul. 31, 2019 (CN) .......................... 201910698284.9

(51) Int. Cl.
*G06Q 10/06* (2012.01)
*G06V 40/16* (2022.01)

(52) U.S. Cl.
CPC ....... *G06V 40/174* (2022.01); *G06Q 10/0633* (2013.01); *G06Q 10/063114* (2013.01); *G06V 40/165* (2022.01)

(58) Field of Classification Search
CPC ........... G06K 9/00302; G06K 9/00248; G06K 9/00597; G06K 9/00771; G06K 9/00255; G06K 9/00335; G06Q 10/063114; G06Q 10/0633; G06N 3/04
See application file for complete search history.

(56) References Cited

U.S. PATENT DOCUMENTS

| 9,868,352 | B1 | 1/2018 | Plummer |
| 10,102,773 | B2* | 10/2018 | Towers ................. G09B 19/165 |
| 10,339,659 | B2* | 7/2019 | Dey ..................... G06K 9/0061 |
| 2016/0343229 | A1* | 11/2016 | Hutchinson .......... G06K 9/0061 |

FOREIGN PATENT DOCUMENTS

| CN | 102749991 A | 10/2012 |
| CN | 102830793 A | 12/2012 |
| CN | 108427503 A | 8/2018 |
| CN | 108492648 A | 9/2018 |
| CN | 109271914 A | 1/2019 |
| CN | 109375765 A | 2/2019 |
| CN | 109949193 A | 6/2019 |

OTHER PUBLICATIONS

First Office Action of the priority application CN201910698284.9.
Second Office Action of the priority application CN201910698284.9.

* cited by examiner

*Primary Examiner* — Phuoc Tran
(74) *Attorney, Agent, or Firm* — J.C. Patents

(57) ABSTRACT

This disclosure provides a method and an apparatus for monitoring a working state, which automatically collect an image of a staff in real time, determines point of gaze information of the staff based on the image of the staff thus collected, and further determines the working state of the staff according to the point of gaze information. Since the whole process does not require the participation of the staff, the normal work of the staff is not disturbed. Moreover, the accuracy in the monitoring of the working state is improved by avoiding influence of the subjective factors on the assessment result if staff participation is involved.

9 Claims, 6 Drawing Sheets

METHOD AND APPARATUS FOR MONITORING WORKING STATE

CROSS-REFERENCE TO RELATED APPLICATION

This application claims priority to Chinese Application No. CN 201910698284.9, filed on Jul. 31, 2019, which is hereby incorporated by reference in its entirety.

TECHNICAL FIELD

This disclosure relates to the field of computer technologies and, in particular, to a method and an apparatus for monitoring a working state.

BACKGROUND

In some workplaces, for example, for air traffic control, a staff is required to monitor and command in a good mental state and with seasoned professional skills, and any slip of mind of a relevant staff may cause serious consequences. Therefore, it is necessary to monitor a working state of the staff.

At present, the staff is usually required to fill in questionnaires for a subjective assessment of the working state of the staff. However, filling in questionnaires can disturb the normal work of the staff, and the monitoring accuracy is not very high.

SUMMARY

This disclosure provides a method and an apparatus for monitoring a working state in order to solve a problem in conventional way of assessing the working state of a staff where normal work of the staff is disturbed and a low monitoring accuracy is provided.

In a first aspect, this disclosure provides a method for monitoring a working state, including:
collecting an image of a staff in real time;
acquiring point of gaze information of the staff according to the image of the staff, where the point of gaze information includes a gaze duration of the point of gaze;
determining the working state of the staff according to the point of gaze information.

In an implementation, the determining the working state of the staff according to the point of gaze information includes:
acquiring a first duration, which is a sum of gaze durations of points of gaze that are not located in a preset monitoring area during a first preset duration; and
determining the working state of the staff according to the first duration.

In an implementation, the determining the working state of the staff according to the first duration includes:
determining that the working state of the staff is a normal state when the first duration is less than or equal to a first preset value.

In an implementation, the preset monitoring area includes multiple critical areas, and the determining the working state of the staff according to the point of gaze information includes:
acquiring a second duration for each of the critical areas, where the second duration is a sum of gaze durations of points of gaze that are located in the critical areas during a second preset duration; and
determining the working state of the staff according to second durations of the multiple critical areas.

In an implementation, the determining the working state of the staff according to second durations of the multiple critical areas includes:
determining that the working state of the staff is a normal state when the second duration of each of the critical areas is greater than or equal to a second preset value.

In an implementation, the determining the working state of the staff according to the point of gaze information includes:
determining that the working state of the staff is an abnormal state when there is a point of gaze whose gaze duration is greater than or equal to a third preset value during a third preset duration.

In a second aspect, this disclosure provides an apparatus for monitoring a working state, including:
an image collecting module, configured to collect an image of a staff in real time;
an acquiring module, configured to acquire point of gaze information of the staff according to the image of the staff, where the point of gaze information includes a gaze duration of the point of gaze; and
a determining module, configured to determine the working state of the staff according to the point of gaze information.

In an implementation, the determining module includes:
a first acquiring unit, configured to acquire a first duration, which is a sum of gaze durations of points of gaze that are not located in a preset monitoring area during a first preset duration; and
a first determining unit, configured to determine the working state of the staff according to the first duration.

In an implementation, the first determining unit is specifically configured to:
determine that the working state of the staff is a normal state when the first duration is less than or equal to a first preset value.

In an implementation, a preset monitoring area includes multiple critical areas, and the determining module includes:
a second acquiring unit, configured to acquire a second duration for each of the critical areas, where the second duration is a sum of gaze durations of points of gaze that are located in the critical areas during a second preset duration; and
a second determining unit, configured to determine the working state of the staff according to second durations of the multiple critical areas.

In an implementation, the second determining unit is specifically configured to:
determine that the working state of the staff is a normal state when the second duration of each of the critical areas is greater than or equal to a second preset value.

In an implementation, the determining module includes:
a third determining unit, configured to determine that the working state of the staff is an abnormal state when there is a point of gaze whose gaze duration is greater than or equal to a third preset value during a third preset duration.

In a third aspect, this disclosure provides an apparatus for monitoring a working state, including: a memory and a processor, where:
the memory is configured to store program instructions;
the processor is configured to invoke the program instructions stored in the memory to implement the method for monitoring a working state provided by any implementation of the first aspect of this disclosure.

In a fourth aspect, this disclosure provides a storage medium, including: a readable storage medium and a computer program, where the computer program is configured to implement the method for monitoring a working state provided by any implementation of the first aspect of this disclosure.

According to the method and the apparatus for monitoring a working state provided by this disclosure, an image of a staff is automatically collected in real time, point of gaze information of the staff is determined based on the image of the staff thus collected, and further, the working state of the staff is determined according to the point of gaze information. Since the whole process does not require the participation of the staff, the normal work of the staff is not disturbed. Moreover, the accuracy in the monitoring of the working state is improved by avoiding influence of the subjective factors on the assessment result if staff participation is involved.

BRIEF DESCRIPTION OF DRAWINGS

In order to illustrate embodiments of this disclosure or technical solutions in the prior art clearly, a brief description of the drawings used in the embodiments or the prior art description will be described below. It is apparent that the described embodiments are a certain embodiment of this disclosure but not all the embodiments, and other drawings may also be obtained by those of ordinary skill in the art in view of the drawings without any creative efforts.

DESCRIPTION OF EMBODIMENTS

In order to make objectives, technical solutions and advantages of embodiments of this disclosure clearer, the technical solutions in the embodiment of this disclosure will be clearly and completely described in the following with reference to the accompanying drawings in the embodiments of this disclosure. It is apparent that the described embodiments are merely part of the embodiments of this disclosure, rather than all of the embodiments. All other embodiments obtained by those skilled in the art based on the embodiments of this disclosure without creative efforts are within the scope of this disclosure.

Figure 1:
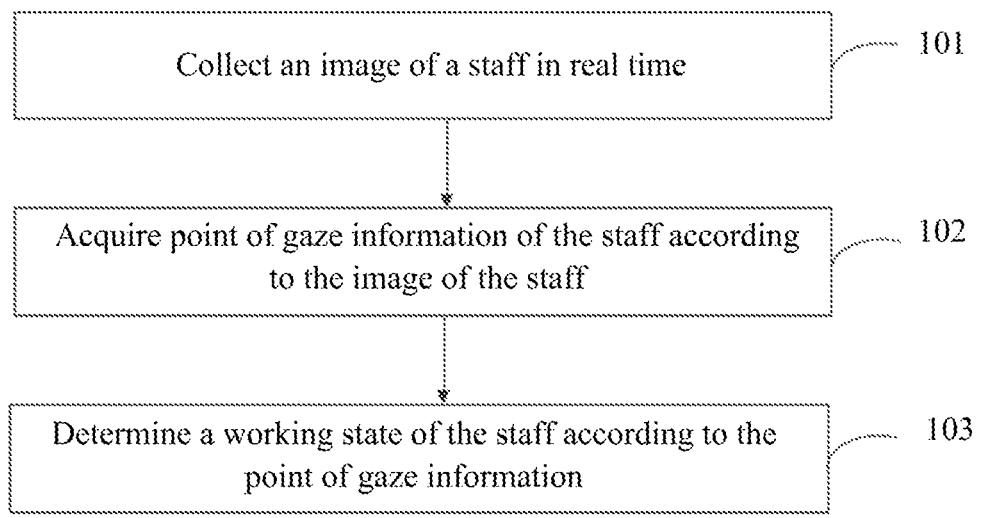
FIG. 1 is a flowchart of a method for monitoring a working state provided by Embodiment 1 of this disclosure.

FIG. 1 is a flowchart of a method for monitoring a working state for provided by Embodiment 1 of this disclosure. The method for monitoring a working state provided by the embodiment can be executed by an apparatus for monitoring a working state. In specific implementation, the apparatus for monitoring the working state can be implemented by software and/or hardware. As show in FIG. 1, the method for monitoring the working state provided by this embodiment includes:

S101, collecting an image of a staff in real time.

Specifically, the image of the staff who is working can be photographed in real time with a camera, or a video of the staff who is working can be shot, and then video images of the staff will be read frame by frame. This embodiment does not limit the amount and type of the camera. For example, multiple cameras can be used to photograph the images or the videos of the staff who is working in real time from different angles, and thus, an ideal image or video may be selected from multiple images or videos that can be acquired by the photographing, such as an image or video that includes a front of the staff. For another example, an infrared camera may be used to supplement the infrared fill light when the ambient light is not enough.

S102, acquiring point of gaze information of the staff according to the image of the staff.

The point of gaze information includes a gaze duration of the point of gaze. The point of gaze information may further include a coordinate of the point of gaze.

In this embodiment, a point of gaze is generated when the staff's line of sight has remained in a certain area for a while. The gaze duration of the point of gaze is the length of time when the staff's line of sight remains in the area. The coordinate of the point of gaze can be determined according to the area. For example, the coordinate of the point of gaze may be the coordinate of a point when the area is the point. For another example, the coordinate of the point of gaze may be a coordinate of a center point of the area when the area covers a certain surface area. This embodiment does not limit a coordinate system when determining the coordinate of the point of gaze. For example, the coordinate system may be a camera coordinate system of the camera. For another example, the coordinate system may be defined according to a monitoring area of the staff. Assuming that the monitoring area is a rectangle, then the coordinate system can take a vertex on the top-left-corner of the monitoring area as an original point, the right direction as the positive axis of the X axis and the down direction as the positive axis of the Y axis.

In an implementation, one impossible implementation of acquiring the point of gaze information of the staff according to the image of the staff includes:

after collecting the image of the staff who is working, a human face in the image may be detected using any existing face detection algorithm, and the human face in the image may be subject to a feature point matching using any existing face module matching algorithm to acquire two-dimensional image coordinate or three-dimensional image coordinate of the face feature point. The face detection algorithm and the face module matching algorithm actually used may be selected according to a calculation capability of the apparatus that executes the method for monitoring a working state, a desired recognition precision or a brightness of the image collected from the staff.

After acquiring the two-dimensional image coordinate or the three-dimensional image coordinate of the face feature point, an eye-area image can be acquired. Then, a line of sight direction of the eyes in the image, or a point of gaze coordinate of the line of sight in the monitoring area can be acquired using line of sight calculation algorithm based on computer vision. This embodiment does not limit the line of sight calculation algorithm, which can be any line of sight calculation algorithm whose input is the eye-area image and whose output is the line of sight direction or the point of gaze coordinate of the line of sight in the monitoring area, such as an algorithm based on an eyeball model or an algorithm based on image regression. If the output of the line of sight calculation algorithm is the line of sight direction, then the line of sight direction will be converted into the point of gaze coordinate in the monitoring area. For example, in the camera coordinate system, taking the calculated three-dimensional eyeball center as the starting point, a ray is drawn along the line of sight direction output from the line of sight calculation algorithm, and the intersection of the ray with the monitoring area is taken as the point of gaze coordinate in the monitoring area.

Within a period of time, point of gaze coordinate data that are continuous in time domain may be acquired according to the images of the staff continuously collected in time domain with the above method. The points of gaze and corresponding point of gaze information may be found according to the point of gaze coordinate data. This embodiment does not limit the manner for acquiring the point of gaze information according to the point of gaze coordinate, and a possible implementation is as follows.

A preset time threshold and a preset space threshold are set. Starting from a current starting point, a first point of gaze coordinate subsequence is acquired from the point of gaze coordinate data that are continuous in the time domain acquired within the above-mentioned period of time, so that the total accumulated duration of the point of gaze coordinate subsequence is greater than the preset time threshold, and all the point of gaze coordinates in the point of gaze coordinate subsequence differ from their average position by less than the preset space threshold, and a point of gaze coordinate in a next frame following the point of gaze coordinate subsequence deviates from the average position by more than the preset space threshold. After finding the first point of gaze coordinate subsequence, the average of all the point of gaze coordinates corresponding to the subsequence is taken as the coordinate of the first point of gaze, and the duration corresponding to the total number of frames corresponding to the subsequence is determined to be the gaze duration of the first point of gaze. Then, in a similar manner, a second point of gaze coordinate subsequence, . . . , an n-th point of gaze coordinate subsequence may be found from the point of gaze coordinate data following the first point of gaze coordinate subsequence, where n≥1, until all of the point of gaze coordinate data has been processed. Thus, all of the points of gaze and their corresponding point of gaze information over the period of time are acquired.

After acquiring all of the points of gaze and the corresponding point of gaze information within the period of time, they may be stored in any manner. For example, they may be stored in the form of a matrix. Values, which are gaze durations of the corresponding points of gaze, are respectively assigned at coordinate positions of the respective points of gaze. Thus, the position and the gaze duration of each of the points of gaze can be described most intuitively, which facilitates subsequent processing.

In an implementation, for the acquiring the point of gaze information of the staff according to the image of the staff, another possible implementation includes:

inputting the image of the staff into a neural network model to acquire the point of gaze information of the staff, where the neural network model is used to acquire the point of gaze information of a person according to an input image including a face.

This embodiment does not limit the type and training process of the neural network model. For example, the neural network model may be a convolutional neural network model.

S103, determining a working state of the staff according to the point of gaze information.

Specifically, in this embodiment, the working state of the staff may include a normal state and an abnormal state. Among them, the normal state refers to that the staff concentrates on the monitoring work with a strong working ability to notice all critical monitoring area. The abnormal state refers to that the staff has at least one of the following conditions: inattention, absence of mind, missing monitoring of some critical areas or the like.

According to the method for monitoring a working state provided by the embodiment, an image of a staff is automatically collected in real time, and point of gaze information of the staff is determined based on the image of the staff thus collected. Further, the working state of the staff is determined according to the point of gaze information. Since the whole process does not require the participation of the staff, the normal work of the staff will not be disturbed, and an accuracy of the working state monitoring is improved by avoiding the influence of subjective factors on the assessment result when staff participation is involved.

Figure 2:
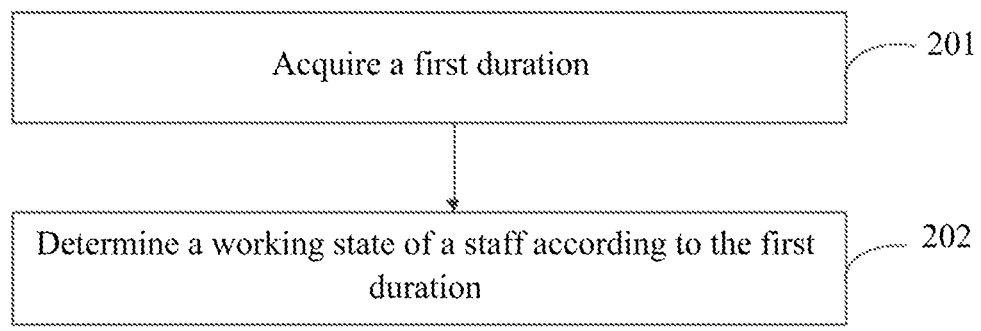
FIG. 2 is a flowchart of a method for monitoring a working state provided by Embodiment 2 of this disclosure.

In another embodiment of this disclosure, referring to FIG. 2, in an implementation, the determining a working state of the staff according the point of gaze information at S103 may include:

S201, acquiring a first duration.

The first duration is a sum of the gaze durations of points of gaze that are not located in a preset monitoring area during the first preset duration.

Specifically, multiple points of gaze may be acquired during the first preset duration. For all the points of gaze during the first preset duration, the point of gaze that is not located in the preset monitoring area can be identified according to the coordinate of each point of gaze and the coordinate range of the preset monitoring area. A total gaze duration of the points of gaze that are not located in the preset monitoring area during the preset first duration can be acquired by summing up the gaze durations corresponding to the points of gaze that are not located in the preset monitoring area. Thus, the first duration is acquired. The coordinate range of the preset monitoring area may be pre-determined with a geometric correction algorithm.

In this embodiment, the first preset duration may be set according to an actual application scenario. Specifically, if the actual application scenario has high requirements about the instantaneity in determining the working state of the staff, the first preset duration may be set to a shorter duration. For example, in a case where even a momentary abnormality that occurs in the working state of the staff can cause serious consequences, the first preset duration needs to be shorter, so that the abnormal working state of the staff can be found in a timely manner. On the contrary, if the actual application scenario has a low requirement about the instantaneity in monitoring the working state of the staff, the first preset duration can be set to a longer duration. For example, in a case where only the working state of the staff during a certain duration is of interest, and a momentary abnormality that occurs in the working state of the staff will not cause serious consequences, the first preset duration can be longer.

S202, determining the working state of the staff according to the first duration.

In this embodiment, no limitation is made on the specific manner for determining the working state of the staff according to the first duration.

As a possible implementation, a first preset value may be configured, and the working state of the staff may be determined according to a relationship between the first duration and the first preset value. If the first duration is less than or equal to the first preset value, it may be determined that the working state of the staff is in the normal state. The first preset value may be configured according to the specific application scenario. For example, if the specific application scenario has a strict requirement regarding the point of gaze of the staff falling outside the monitoring area, the first preset value may be set to be shorter. If the specific application scenario has a less strict requirement regarding the point of gaze of the staff falling outside the monitoring area, the first preset value may be set to be longer. For example, if the specific application scenario does not allow the point of gaze of the staff to fall outside the monitoring area, the first preset value then may be set to be 0.

As another possible implementation, the working state of the staff may be determined according to a relationship between a ratio of the first duration to the first preset duration and a first preset ratio. If the ratio of the first duration to the first preset duration is less than or equal to the first preset ratio, it may be determined that the working state of the staff is the normal state. If the ratio of the first duration to the first preset duration is greater than the first preset ratio, it may be determined that the working state of the staff is the abnormal state. The first preset ratio may be set in the same manner as the first preset value.

Figure 3:
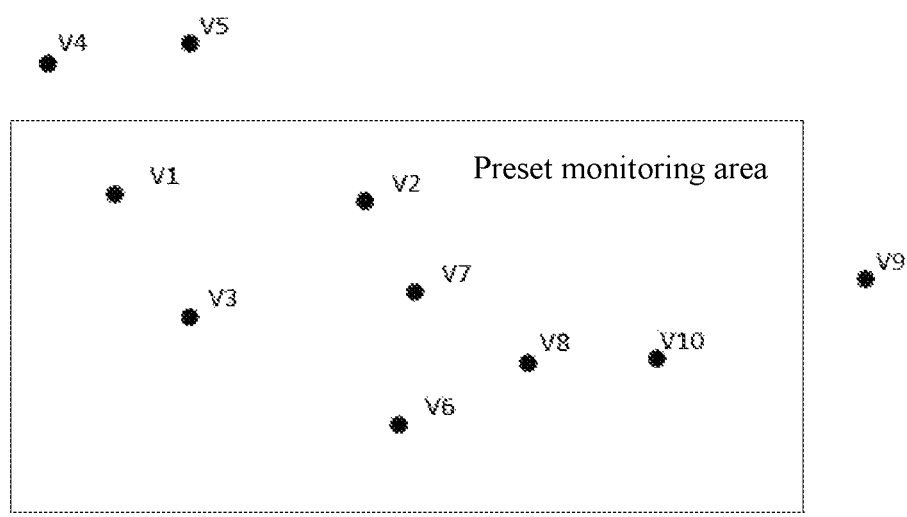
FIG. 3 is a schematic diagram of a distribution of point of gazes provided by an embodiment of this disclosure.

Now, S201 to S202 will be described with reference to FIG. 3. As shown in FIG. 3, there are 10 points of gaze V1 to V10 in a first preset duration, where the points of gaze V1 to V3, V6 to V8 and V10 are located in a preset monitoring area, and the points of gaze V4, V5 and V9 are located outside the preset monitoring area. Assuming that the first preset value is $T_1$, the gaze durations corresponding to the points of gaze V4, V5 and V9 are $t_4$, $t_5$, and $t_9$, respectively. If $t_4+t_5+t_9$ is greater than $T_1$, then it can be determined that the staff is absent minded while working because he/she is looking at a content outside the preset monitoring area rather than focusing on the work.

According to the method for monitoring a working state provided by the embodiment, a determination is made as to whether a sum of gaze durations of points of gaze located outside a preset monitoring area exceeds a certain threshold, thus enabling the assessment as to whether the attention of a staff is somewhere other than concentrating on monitoring the preset monitoring area during work.

Figure 4:
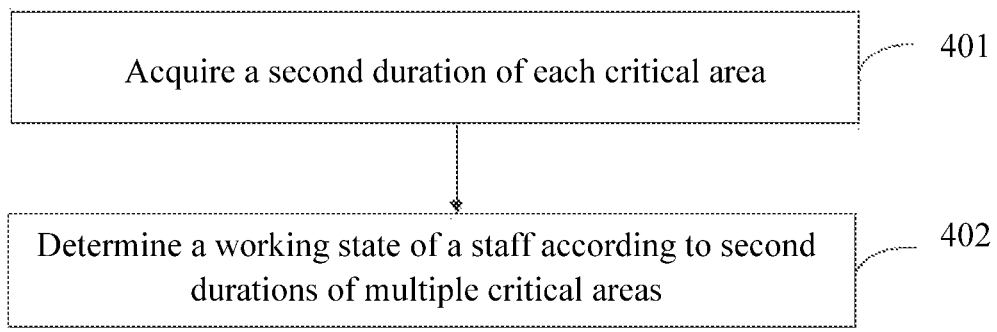
FIG. 4 is a flowchart of a method for monitoring a working state provided by Embodiment 3 of this disclosure.

In still another embodiment of this disclosure, referring to FIG. 4, in an implementation, the preset monitoring area monitored by the staff includes multiple critical areas, and the determining a working state of the staff according to the point of gaze information at S103 may include:

S401, acquiring a second duration of each critical area.

The second duration is a sum of gaze durations of points of gaze located in the critical area during a second preset duration.

The embodiment does not limit the number of the critical areas and the position of each critical area in the preset monitoring area, which may be set as needed.

In an implementation, the critical area may be a monitoring area that displays important content in the preset monitoring area, e.g., an area displaying a flight location, an information point location or the like. The information point location may include a flight conflict forewarning location, a minimum-safe-altitude forewarning location or the like.

In an implementation, the preset monitoring area may be divided into multiple areas according to a certain rule, and each area is a critical area. For example, the preset monitoring area may be a rectangular area, and the rectangular area is equally divided into 16 areas of equal sizes along the length direction and the width direction. The 16 areas are all critical areas.

In this embodiment, the second preset duration may be set in the same manner as the first preset duration in the embodiment shown in FIG. 2 is set, which will not be elaborated herein.

Multiple points of gaze may be acquired during the second preset duration. For each point of gaze during the second preset duration, the point of gaze included in the critical area may be determined according to coordinate of each point of gaze and a coordinate range of the critical area. The coordinate range of each critical area can be pre-determined with a geometric correction algorithm. For each critical area, a total gaze duration of all points of gaze located in the critical area during the second preset duration can be acquired by summing up the gaze durations corresponding to all the points of gaze in the critical area during the second preset duration, that is, the second duration corresponding to the critical area is acquired.

S402, determining a working state of a staff according to second durations of the multiple critical areas.

In this embodiment, no limitation is imposed over the determining the working state of the staff according to second durations of the multiple critical areas.

As a possible implementation, a second preset value may be provided to determine the working state of the staff according to a relationship between the second durations of the multiple critical areas and the second preset value. If the second duration of each critical area is greater than or equal to the second preset value, then it may be determined that the working state of the staff is in a normal state. The second preset value may be determined empirically. For example, the second preset value may be set to be the minimum time required for observing the content displayed in the critical area.

Figure 5:
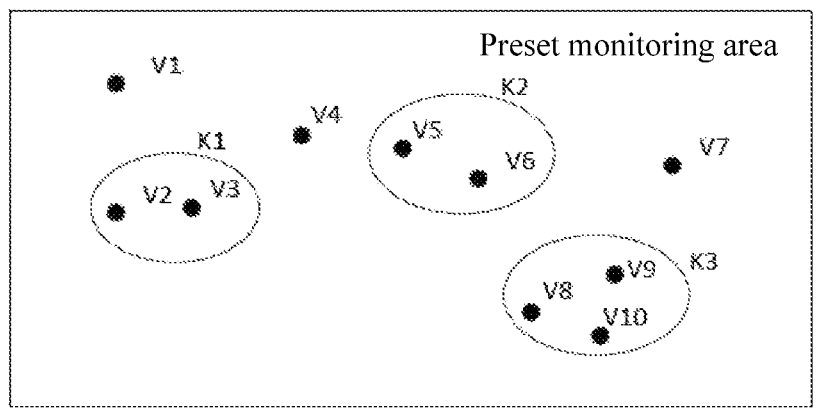
FIG. 5 is a schematic diagram of a distribution of critical areas and a distribution of point of gazes provided by an embodiment of this disclosure.

Now, S401 to S402 will be described with reference to FIG. 5. As shown in FIG. 5, there are three critical areas, which are a first critical area K1, a second critical area K2 and a third critical area K3, respectively. During the second preset duration, the points of gaze V2 and V3 are located in the first critical area K1, the gaze durations corresponding to the points of gaze V2 and V3 are respectively $t_2$ and $t_3$, the points of gaze V5 and V6 are located in the second critical area K2, the gaze durations corresponding to the points of gaze V5 and V6 are respectively $t_5$ and $t_6$, and the points of gaze V8 to V10 are located in the third critical area K3, the gaze durations corresponding to the respective points of gaze are respectively $t_8$, $t_9$, and $t_{10}$. According to the number of point of gaze in each critical area and the gaze duration corresponding to each point of gaze during the second preset duration, the total duration corresponding to the first critical area K1 is $t_2+t_3$, the total duration corresponding to the second critical area K2 is $t_4+t_5$, and the total duration corresponding to the third critical area K3 is $t_8+t_9+t_{10}$ during the second preset duration. Assuming that the second preset value is $T_2$, then, if $t_2+t_3$, $t_4+t_5$, and $t_8+t_9+t_{10}$ are all greater than or equal to $T_2$, it may be determined that the staff has sufficient gaze in surveying each critical area in the preset monitoring area, and it can further be determined that the staff is currently at a good mental state and exhibiting strong working ability. If at least one of $t_2+t_3$, $t_4+t_5$ and $t_8+t_9+t_{10}$ is less than $T_2$, it can be determined that the staff has missed monitoring of the corresponding critical area, and it can further be determined that the staff is currently at a poor mental state or exhibiting flawed capability.

According to the method for monitoring a working state provided by the embodiment, when the total gaze durations for respective critical areas for the staff within a period of time is found to be less than a certain threshold, it can be determined that the staff has missed a critical area in the preset monitoring area during the monitoring. Furthermore, the spirit and working level of the staff at work can be assessed.

In still another embodiment of this disclosure, in an implementation, the determining a working state of the staff according to the point of gaze information at S103 may include:

if there is a point of gaze whose gaze duration is greater than or equal to a third preset value during a third preset duration, determining that the working state of the staff is an abnormal state.

Specifically, when a person is mentally preoccupied or tired, the person tends to gaze at a place with a blank mind, that is, in absence of mind. Therefore, a working state of a staff may be determined according to whether there is a long gaze at a place. For example, it is assumed that the third preset value is $T_3$, and there are five points of gaze V1 to V5 in the preset monitoring area during the third preset duration. If the gaze duration corresponding to the point of gaze V2 is greater than or equal to $T_3$, it may be determined that the staff is in the absence of mind at work during the gaze duration corresponding to V2. Thus, it may be determined that the staff fell into an abnormal working state during the third preset duration.

In this embodiment, the third preset duration may be set in the same manner as the first preset duration in the embodiment shown in FIG. 2. The third preset duration may be the same as, or different from, the first preset duration. Alternatively, the third preset value may be determined empirically.

According to the method for monitoring a working state of the embodiment, when a staff is found to have continuously gazed at a place in a preset monitoring area during a duration that exceeds a threshold, it can be determined that the staff is in the absence of mind at work, and could be at a poor mental state.

It should be noted that, in the above S103, the various implementations for determining the working state of the staff according to the point of gaze information may be combined with each other, and will not be limited in this disclosure.

Figure 6:
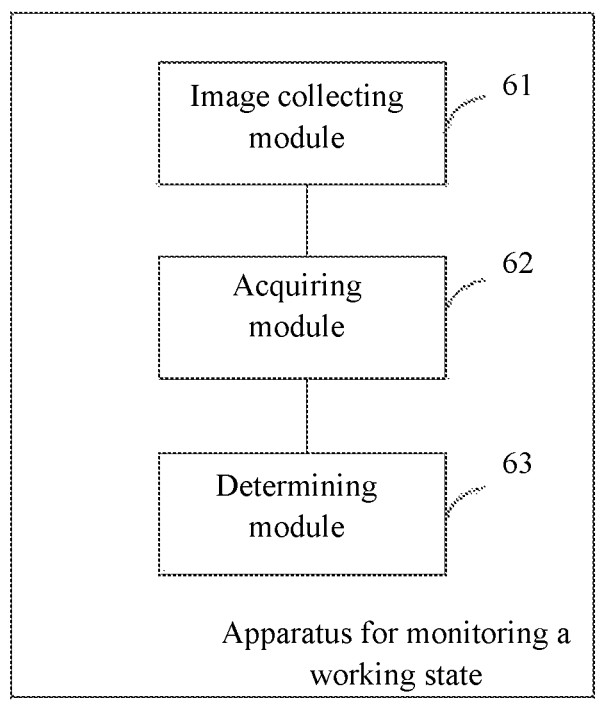
FIG. 6 is a schematic structural diagram of an apparatus for monitoring a working state provided by an embodiment of this disclosure.

FIG. 6 is a schematic structural diagram of an apparatus for monitoring a working state according to an embodiment of this disclosure. The apparatus for monitoring a working state provided by the embodiment is used to perform the method for monitoring a working state provided by any method embodiments of this disclosure. As shown in FIG. 6, the apparatus for monitoring a working state provided by this embodiment may include:

an image collecting module 61, configured to collect an image of a staff in real time;

an acquiring module 62, configured to acquire point of gaze information of the staff according to the image of the staff, where the point of gaze information includes a gaze duration of the point of gaze;

a determining module 63, configured to determine a working state of the staff according to the point of gaze information.

In an implementation, the determining module may include:

a first acquiring unit, configured to acquire a first duration, the first duration is a sum of gaze durations of points of gaze that are not located in a preset monitoring area during a first preset duration;

a first determining unit, configured to determine the working state of the staff according to the first duration.

In an implementation, the first determining unit is specifically configured to:

if the first duration is less than or equal to a first preset value, determine that the working state of the staff is a normal state.

In an implementation, a preset monitoring area includes multiple critical areas, and the determining module may include:

a second acquiring unit, configured to acquire a second duration for each critical area, where the second duration is a sum of gaze durations of points of gaze located in the critical area during a second preset duration;

a second determining unit, configured to determine the working state of the staff according to second durations of the multiple critical areas.

In an implementation, the second determining unit is specifically configured to:

if the second duration of each of the critical areas is greater than or equal to the second preset value, determine that the working state of the staff is a normal state.

In an implementation, the determining module may include:

a third determining unit, configured to determine that the working state of the staff is an abnormal state if there is a point of gaze whose gaze duration is greater than or equal to the third preset value during the third preset duration.

The apparatus for monitoring a working state provided in this embodiment is configured to perform the method for monitoring a working state provided by any method embodiment of this disclosure. The technical principle and the technical effect are similar, and will not be elaborated again herein.

Figure 7:
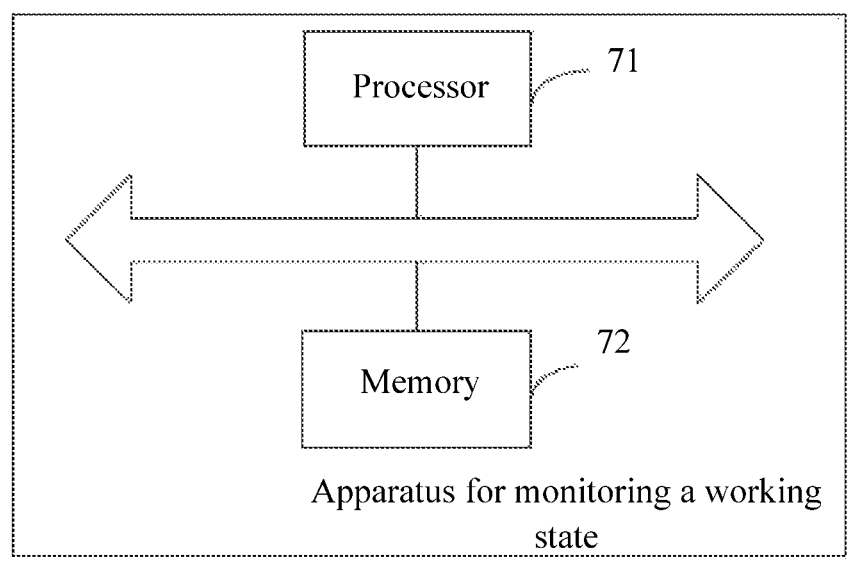
FIG. 7 is another schematic structural diagram of the apparatus for monitoring a working state provided by an embodiment of this disclosure.

FIG. 7 is another schematic structural diagram of the apparatus for monitoring a working state according to an embodiment of this disclosure. The apparatus for monitoring a working state provided by this embodiment is configured to perform the method for monitoring a working state provided by any method embodiment of this disclosure. As shown in FIG. 7, the apparatus for monitoring a working state provided by this embodiment may include: a memory 72 and a processor 71;

the memory 72 is configured to store program instructions;

the processor 71 is configured to invoke the program instructions stored in the memory to implement the method for monitoring a working state provided by any method embodiment of this disclosure.

The specific implementation and technical effects are similar, and will not be elaborated again herein.

It should be noted that the above embodiments are only used to explain, rather than to limit, the technical solutions of the embodiments of this disclosure. Although the embodiments of this disclosure have been described in detail with reference to the foregoing embodiments, those skilled in the art should understand that the technical solutions recorded in the foregoing embodiments may still be modified, or some or all of the technical features may be equivalently substituted; and the modification or substitution does not cause the essence of the corresponding technical solutions to deviate from the scope of the technical solutions of embodiment of this disclosure.

What is claimed is:

1. A method for monitoring a working state, comprising:
collecting an image of a staff in real time;
acquiring point of gaze information of the staff according to the image of the staff, wherein the point of gaze information comprises a gaze duration of the point of gaze; and
determining the working state of the staff according to the point of gaze information;
wherein the determining the working state of the staff according to the point of gaze information comprises:
acquiring a first duration, and determining the working state of the staff according to the first duration, wherein the first duration is a sum of gaze durations of points of gaze that are not located in a preset monitoring area during a first preset duration, and the preset monitoring area comprises multiple critical areas; or
acquiring multiple second durations corresponding to multiple critical areas one by one, and determining the working state of the staff according to the multiple second durations of the multiple critical areas, wherein the second duration is a sum of gaze durations of points of gaze that are located in the corresponding critical area during a second preset duration.

2. The method according to claim 1, wherein the determining the working state of the staff according to the first duration comprises:
determining that the working state of the staff is a normal state when the first duration is less than or equal to a first preset value.

3. The method according to claim 1, wherein the determining the working state of the staff according to the multiple second durations of the multiple critical areas comprises:
determining that the working state of the staff is a normal state when the second duration of each of the critical areas is greater than or equal to a second preset value.

4. The method according to claim 1, wherein the determining the working state of the staff according to the point of gaze information comprises:
determining that the working state of the staff is an abnormal state when there is a point of gaze whose gaze duration is greater than or equal to a third preset value during a third preset duration.

5. An apparatus for monitoring a working state, comprising:
a memory and a processor, wherein:
the memory is configured to store program instructions;
the processor is configured to invoke the program instructions stored in the memory to:
collect an image of a staff in real time;
acquire point of gaze information of the staff according to the image of the staff, wherein the point of gaze information comprises a gaze duration of the point of gaze; and
determine the working state of the staff according to the point of gaze information;
wherein the processor is further configured to invoke the program instructions stored in the memory to:
acquire a first duration, and determine the working state of the staff according to the first duration, wherein the first duration is a sum of gaze durations of points of gaze that are not located in a preset monitoring area during a first preset duration, and the preset monitoring area comprises multiple critical areas; or
acquire multiple second durations corresponding to multiple critical areas one by one, and determine the working state of the staff according to the multiple second durations of the multiple critical areas, wherein the second duration is a sum of gaze durations of points of gaze that are located in the corresponding critical area during a second preset duration.

6. The apparatus according to claim 5, wherein the processor is further configured to invoke the program instructions stored in the memory to:
determine that the working state of the staff is a normal state when the first duration is less than or equal to a first preset value.

7. The apparatus according to claim 5, wherein the processor is further configured to invoke the program instructions stored in the memory to:
determine that the working state of the staff is a normal state when the second duration of each of the critical areas is greater than or equal to a second preset value.

8. The apparatus according to claim 5, wherein the processor is further configured to invoke the program instructions stored in the memory to:
determine that the working state of the staff is an abnormal state when there is a point of gaze whose gaze duration is greater than or equal to a third preset value during a third preset duration.

9. A non-volatile storage medium, comprising: a readable storage medium and a computer program, wherein the computer program is configured to implement the method according to claim 1.

* * * * *